United States Patent [19]
Barradas

[11] Patent Number: 5,445,061
[45] Date of Patent: Aug. 29, 1995

[54] COMBINATION BREAD MAKING MACHINE AND COOKER

[76] Inventor: George Barradas, 15 River View Ct., Greenwich, Conn. 06831

[21] Appl. No.: 84,326

[22] Filed: Jun. 30, 1993

Related U.S. Application Data

[63] Continuation-in-part of Ser. No. 991,260, Dec. 16, 1992, abandoned.

[51] Int. Cl.⁶ .............................................. A47J 27/00
[52] U.S. Cl. ........................................ 99/340; 99/348; 99/357; 99/448; 366/98; 366/146; 366/314; 219/400
[58] Field of Search .................... 99/327, 328, 329 R, 99/331, 332, 348, 357, 467, 448, 468, 483, 339, 340; 366/69, 98, 144–146, 314, 601; 126/21 A; 426/504, 512; 219/400

[56] References Cited

U.S. PATENT DOCUMENTS

| | | | |
|---|---|---|---|
| 4,538,509 | 9/1985 | Ojima et al. | 99/352 X |
| 4,776,265 | 10/1988 | Ojima | 99/468 X |
| 4,780,596 | 10/1988 | Matasushima et al. | 219/400 |
| 4,844,048 | 7/1989 | Aruga et al. | 99/348 X |
| 4,903,589 | 2/1990 | Aoyama | 99/331 X |
| 4,951,559 | 8/1990 | Arao et al. | 99/348 |
| 4,957,040 | 9/1990 | Nakakura et al. | 366/145 X |
| 4,977,822 | 12/1990 | Seo et al. | 366/98 X |
| 4,984,512 | 1/1991 | Takahashi et al. | 99/321 |
| 5,054,383 | 10/1991 | Cho | 99/468 X |
| 5,076,153 | 12/1991 | Takahashi et al. | 366/146 X |
| 5,145,252 | 9/1992 | Oh | 366/98 |

*Primary Examiner*—Timothy F. Simone
*Attorney, Agent, or Firm*—Alfred E. Miller

[57] ABSTRACT

A baking and cooking machine which can knead dough and bake bread, but can also be used as a general oven for grilling, broiling and steaming food products. The device is rectangular in shape and the oven heating system includes a heating element and a fan, with a baffle arranged to conduct and direct a large part of the heated air into the oven chamber and against the side walls to thereby augment the heat in the chamber.

8 Claims, 7 Drawing Sheets

COMBINATION BREAD MAKING MACHINE AND COOKER

This application is a continuation-in-part of Ser. No. 07/991,260, filed Dec. 16, 1992, now abandoned.

The present invention relates to a device for automatically making bread, as well as automatically making dough. The device also grills, broils or steams food products.

Portable machines are known for solely making breads, such as Welbilt Model ABM-100-3 which is of circular construction and utilizes a Calrod heating element and a motor-driven shaft rotating a dough blade. This device or apparatus only mixes the dough in a circular shape and bakes the dough to form a circular loaf of bread. Another portable device presently being sold is the Decosonic convection oven, that is also circular in configuration and is provided with a heating element and a lid which is also provided with a rotatable fan for directing heated air from the top of the device into the receptacle in which food is placed so that the food items are cooked by means of the heater and the fan mounted in the top cover of the oven.

BACKGROUND OF THE INVENTION

In order to overcome the drawbacks of the above described bread machine, as well as the convection oven, the two processes have been combined in the present invention in which a portable unit of a generally rectangular configuration is seen in which the oven appears on the left hand side of the unit while the two motors and heater of the device are laterally disposed on the right hand side of the unit with a vertical wall therebetween. The wall is provided with a substantial opening provided with a grill so that heated hot air can be propelled by a fan into the interior of the dough making and cooking chamber. A receptacle is provided centrally in the cooking chamber wherein an upright rotatable shaft projects through a central opening in the bottom of the receptacle, and affixed to the top of the shaft is a rotatable dough blade. The shaft is motor-driven so that the dough blade is rotated in order to thoroughly mix the dough. Furthermore, hot air is propelled through the grill in the side wall of the chamber. The fan motor, as well as the heater element operating in conjunction therewith, together with the motor for rotating the dough blade shaft, are mounted in a laterally disposed housing. The fan blade is provided with a cowling that is angled in such a manner that the trajectory of the heated air bounces off the sides of the cooking chamber increasing friction, and consequently augmenting the heat generated within the chamber. Thus, since the temperature in the cooking chamber has increased, the food therein will be cooked more rapidly.

The above and other objects and features of the invention will become apparent by reference to the following description of my invention and the drawings.

DESCRIPTION OF THE PREFERRED EMBODIMENTS

Figure 1:
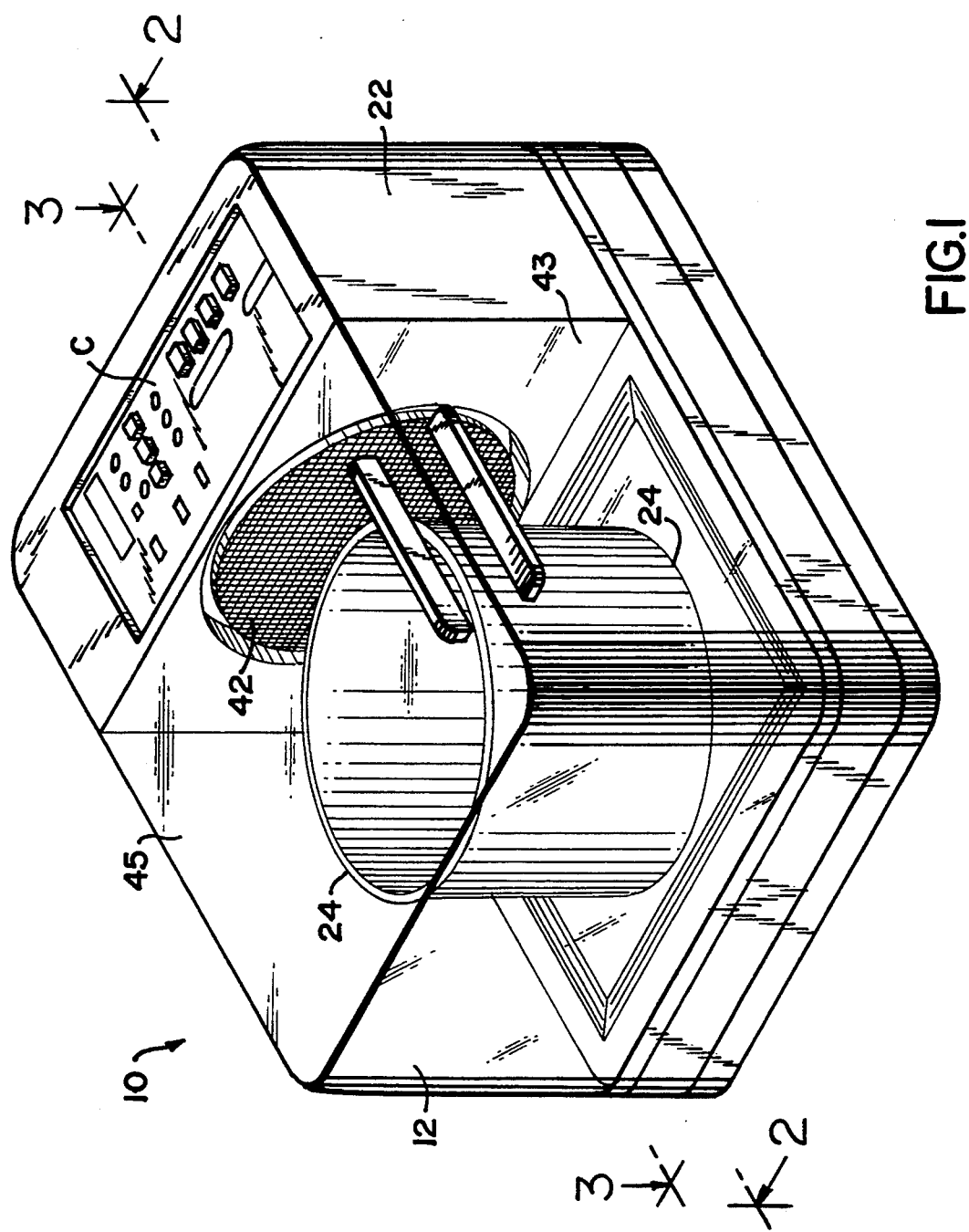
FIG. 1 is a perspective view of the combination bread making machine and cooker of the present invention showing the device in the dough making mode.
Figure 2:
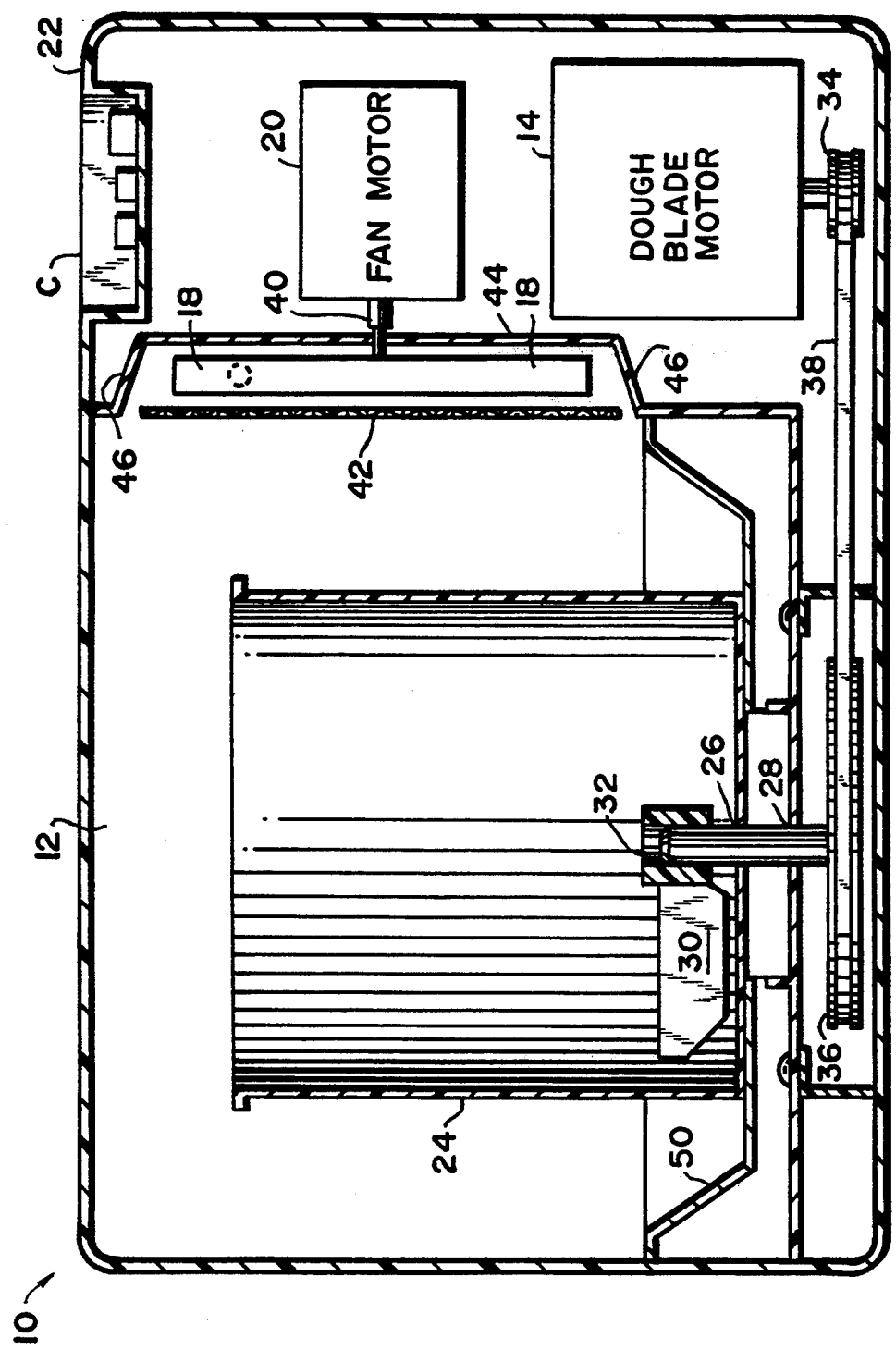
FIG. 2 is a cross-sectional view taken along the lines 2—2 of FIG. 1.
Figure 3:
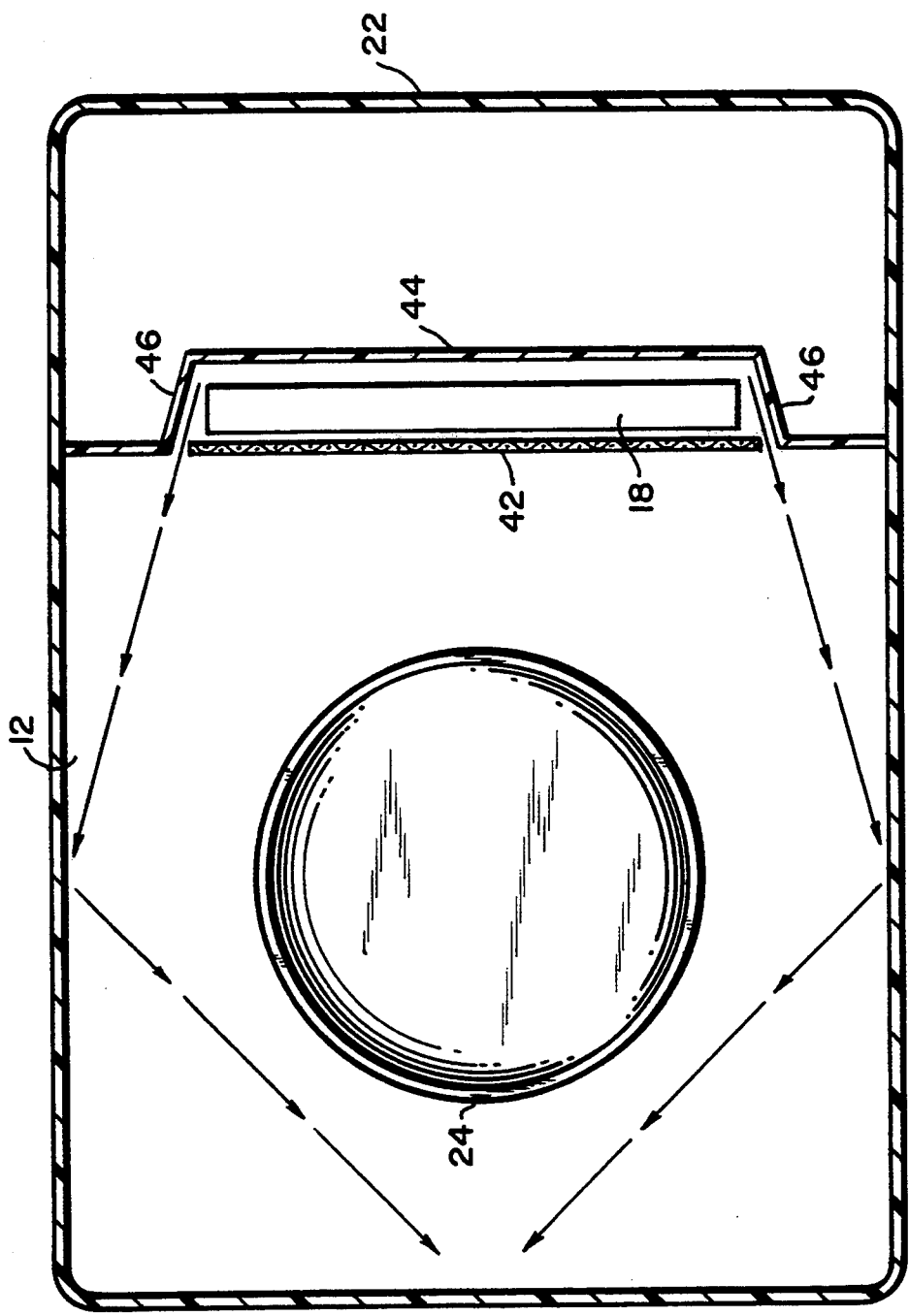
FIG. 3 is a top view taken along the lines 3—3 of FIG. 1.

Referring to FIGS. 1-3, the combination portable bread making machine and cooker constructed according to the teachings of my invention is referred to generally by the reference numeral 10 is rectangular in shape. The oven chamber 12 is on the left of the device while the drive motor 14, the heater 16, fan 18 and fan motor 20 are mounted within the housing 22 on the right-hand side of the device.

Within the oven chamber 12 is a pot 24 which is preferably circular in configuration. The base of the pot is provided with an opening 26 through which blade shaft 28 projects, having a dough hook and blade 30. Both the blade shaft 28 and the collar 32 of blade 30 are out of round, but are complimentary. The drive motor 14 has a pulley 34 while the blade shaft 28 has a pulley 36, a drive belt 38 passes around both pulleys 34 and 36 to rotate the blade 30, as seen in FIG. 2. The dough blade 30 lifts and folds the dough to thereby create a dough kneading action.

Figure 5:
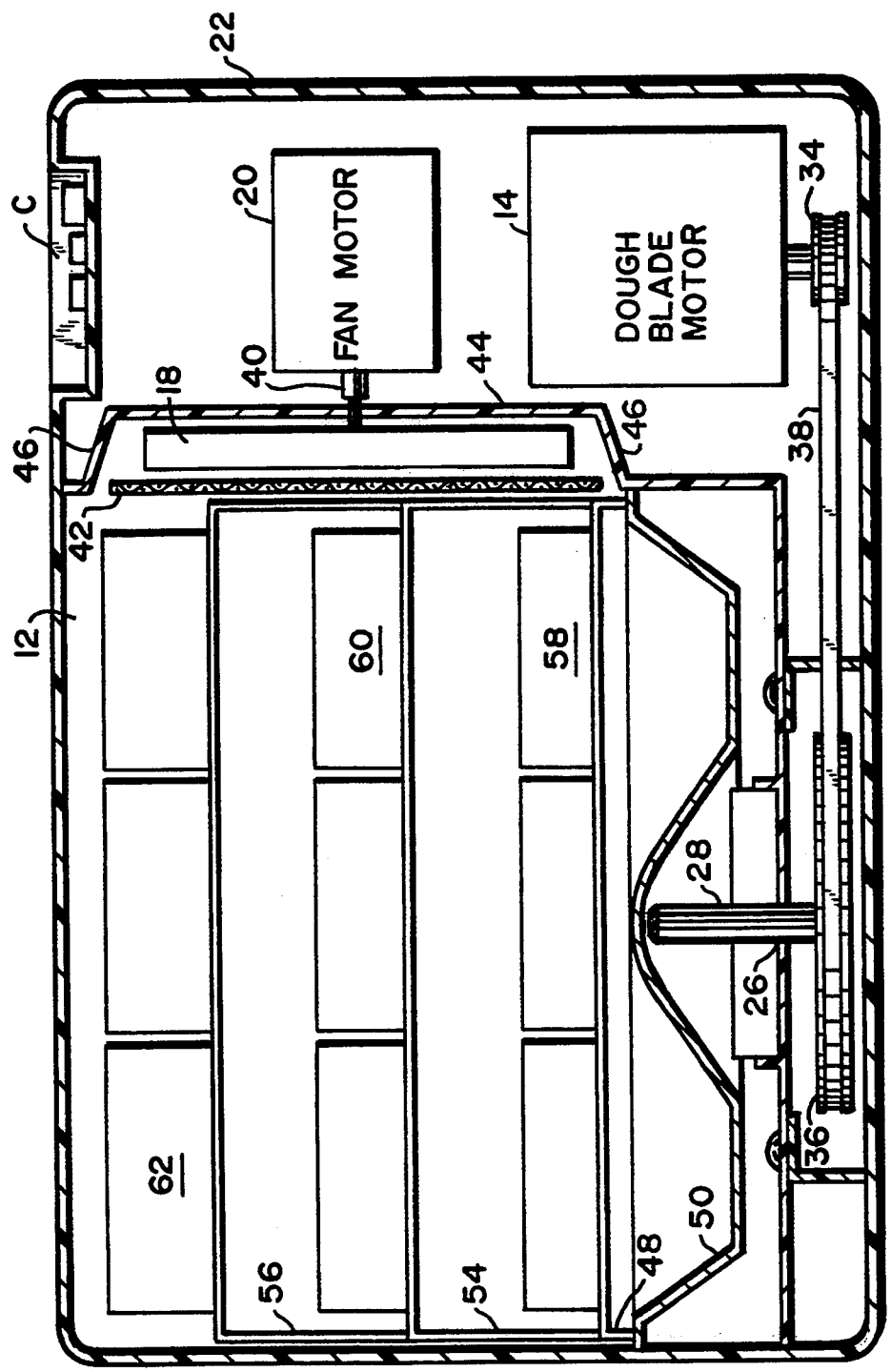
FIG. 5 is a front vertical sectional view of the bread making machine and cooker in the cooking mode with superimposed and spaced racks for food items being cooked simultaneously.

As seen in FIGS. 2 and 5, the fan motor 20 is mounted above the drive motor 14. The fan motor shaft 40 is connected to the fan 18. Mounted in the air flow path of the fan 18 is the heater 16, which may be of the coil resistance type, or any other suitable heater device. Positioned in front of the heater 16 and fan 18 is a preferably circular grille 42. Surrounding the fan 18 is a peripheral flange or baffle 44 whose shape is particularly seen in FIG. 3 having angled sides 46 whereby the air flow generated by the rotation of fan 18 takes the path shown by the arrows in FIG. 3 thereby bouncing off the side walls of the rectangular chamber 12 generating augmented heat in the chamber due to friction caused by the airflow striking the side walls of the chamber.

Figure 4:
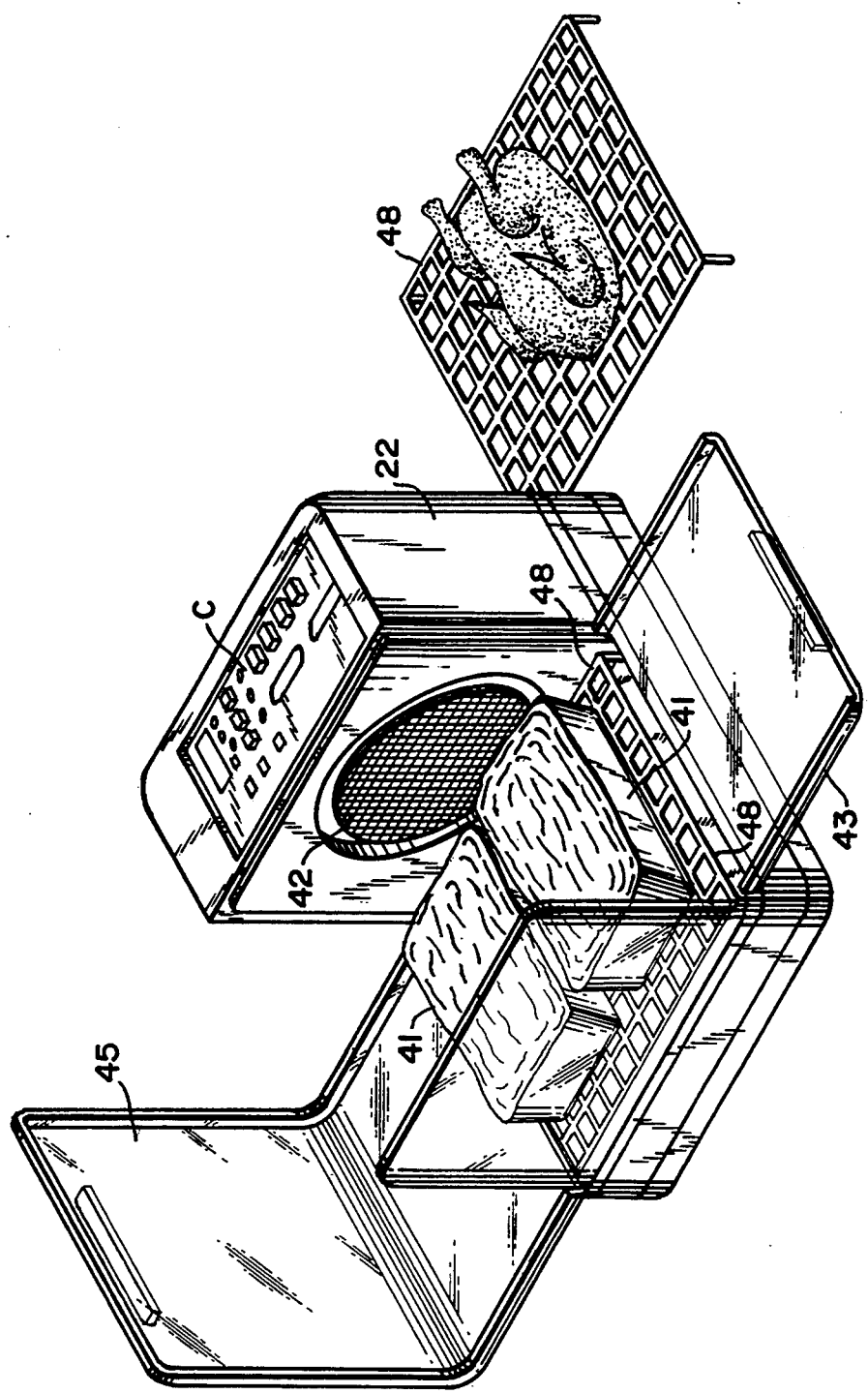
FIG. 4 is a perspective view of the bread making machine and cooker in the baking mode, and showing the front and top doors in their open position and a chicken on a second baking rack for insertion in the oven.

The process of making bread commences by inserting the pot 24 over the drive shaft 28 whereby the shaft protrudes through the opening 26 in the base of the pot. The dough blade 30 is inserted on the end of the shaft for rotation within the pot. The various ingredients for making bread are then placed in the pot 24, such as flour and yeast, and the driving motor 14 is activated and the blade 30 is rotated thereby kneading the dough. After the dough is kneaded to the appropriate consistency the dough is removed from the pot, after having risen, and placed in pans 41 and inserted in the oven chamber 12, as seen in FIG. 4. It will be noted that the chamber is provided with a pivotal front door 43 as well as a pivotal top door 45. Consequently, the oven chamber can be completely opened in order to easily place food products in the oven, and to remove the same without difficulty. The controls C for the unit are placed on the top surface 47 of the housing 22.

As seen in FIGS. 4 and 5 a rack 48, preferably constructed of wire supports the bread pans 41 over the shaft 28, as well as over the drip pan 50. The hot air being propelled into the chamber 12 by means of fan 18 bakes the bread, the oven being brought up to temperature more rapidly due to the frictional heat caused by directing some of the air flow against the side walls of the oven chamber.

As seen in FIG. 5, the oven chamber 12 can accommodate a number of spaced, superimposed racks 48, 54 and 56 whereby different food products can be cooked on various levels. For example, on the lower level 58, meat and chicken can be cooked, on the middle level 60, vegetables can be cooked, while on the top level 62 bread can be baked. Thus, it should be evident that the present appliance can not only be utilized for preparing and baking bread, but can also be used as a general oven for broiling, grilling steaming etc. of a variety of foods.

Referring to FIGS. 6–9, alternate embodiments of the present invention are shown in which a convection oven, referred to generally by the numeral 64, has double insulating side walls 66 and 68 and double insulating bottom walls 70 and 72. The top of the oven is provided with a heat resistant transparent operable top 74, which is pivoted (not shown) to the oven in a manner so that the top opens upwardly for insertion and removal of food to be baked or cooked.

Figure 6:
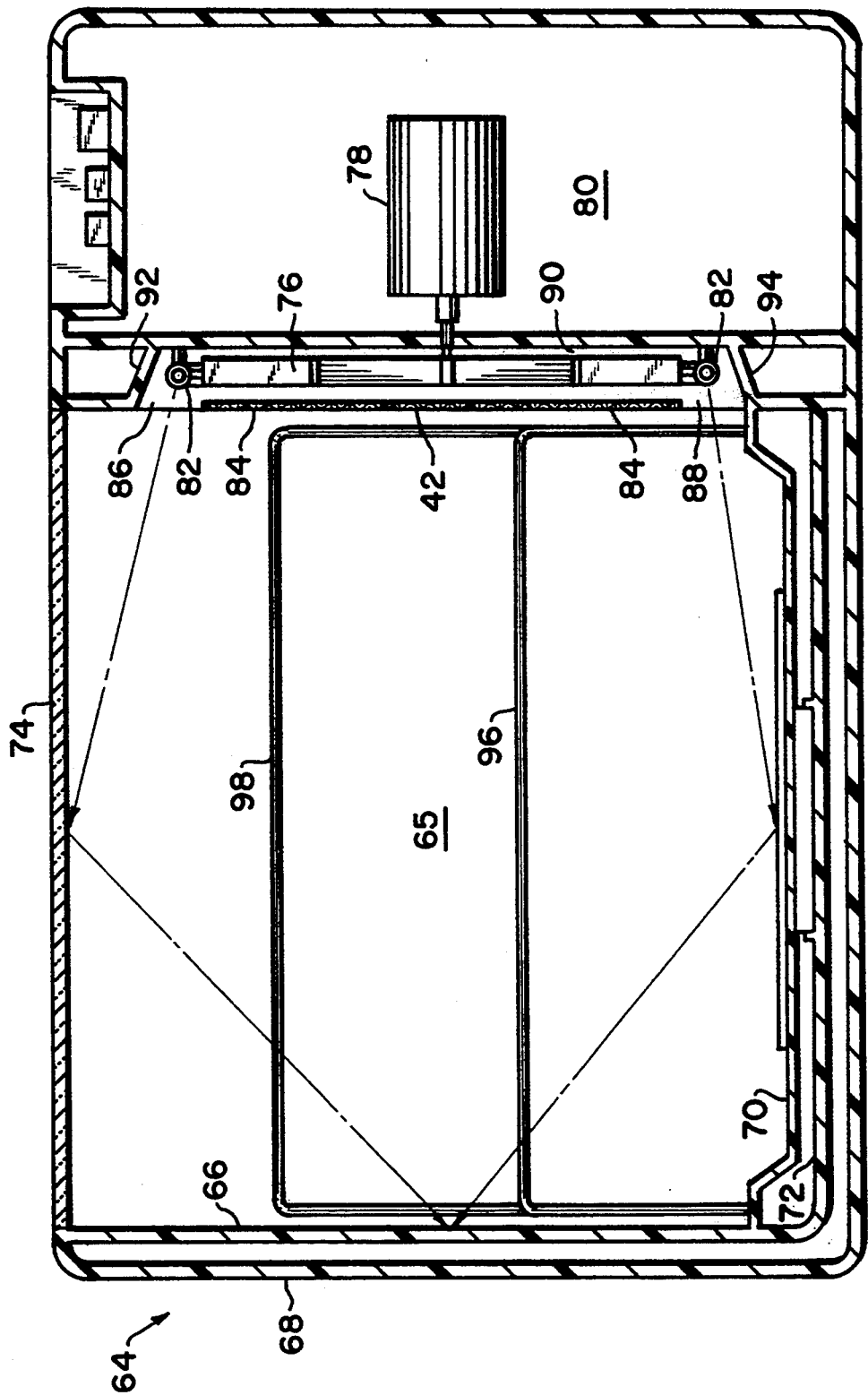
FIG. 6 is a cross-sectional view of an alternate embodiment of the present invention which constitutes a convection oven.
Figure 7:
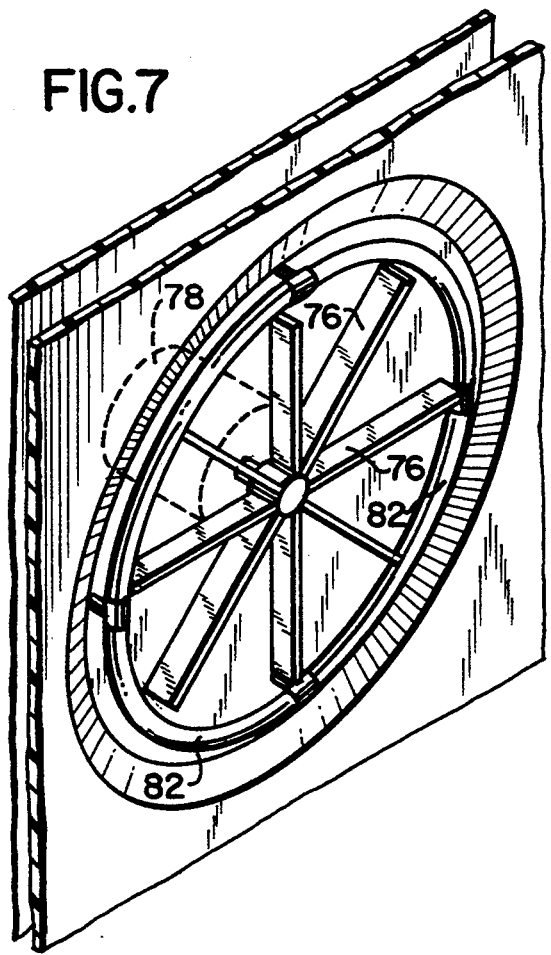
FIG. 7 is a perspective view of the fan of the oven as seen in FIG. 6 but with more detail.
Figure 8:
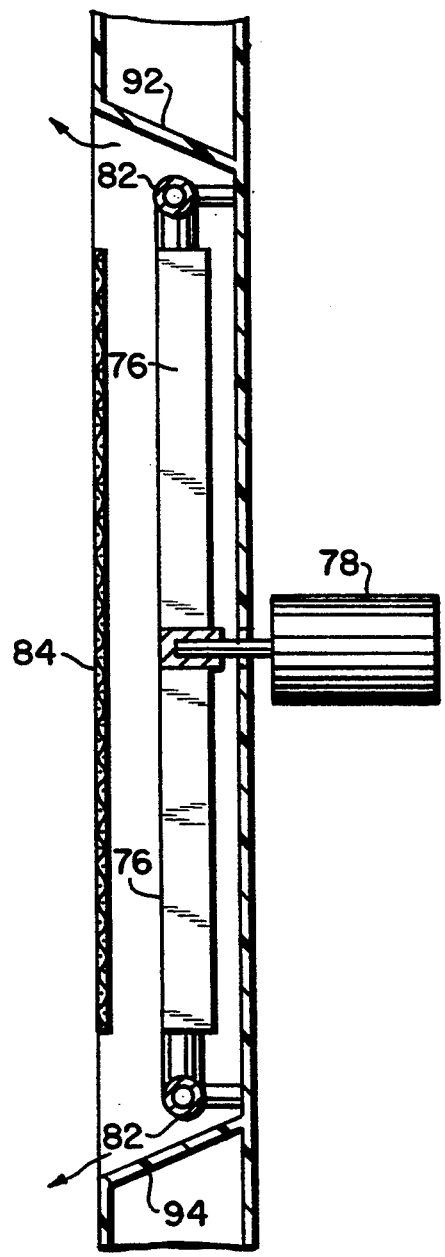
FIG. 8 is an enlarged, side elevational view partly in section showing the fan and accompanying structure.

As seen in FIGS. 6–8, the rotary fan 76 is driven by a fan motor 78 located in the side compartment 80 of the cooker. Located around the periphery of the fan is a circular wire heater 82. Immediately in front of the fan 76 is the perforated baffle plate 84 leaving a peripheral circular opening 88 opposite the back plate 90. Back plate 90 has upper and lower angled parts 92 and 94 which are at an acute angle to the top 74 of the oven as well as the bottom wall 72 thereof, respectively. As a result of the present construction, the heated air generated by the heater and propelled by the fan is directed 360° through the unobstructed opening 88 in the direction as shown by the arrows in FIG. 6 so that the air is circulated within the oven 66 by bouncing off the interior of the oven 64 thereof, i.e. wall 72, wall 69, and top 74, as shown in the drawings. Consequently, the friction created by bouncing the heated air off the interior walls and top of the oven augments the heat within the oven which results in the faster heating and cooking of the food items placed in the interior 65 of the oven 64. The heated air returns to the open chamber 100 through the holes 102 in the baffle plate.

A pair of shelves 96 and 98 are placed in the interior of the chamber with various food items thereon for cooking. At the user's option, additional shelves may be used if more food items are to be cooked.

Figure 9:
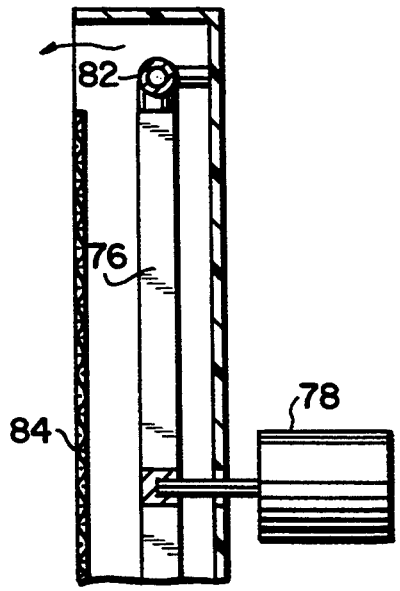
FIG. 9 is a partial cross-sectional view of another embodiment of the fan of the present invention.

Referring now to FIG. 9, another embodiment of the present invention is shown in which the back plate 90a forms a side wall of the oven extending vertically terminating at one end adjacent to the top 74 of the oven and adjacent to the bottom 70 at the other end of the back plate. The heated air is propelled by the rotating fan 18 into the interior of the oven 64 for cooking or baking the food items therein by convection.

Although the present invention has been disclosed and described with reference to serveral embodiments thereof, it should be made apparent that other variations and modifictions may be made, and it is intended that the following claims cover said variations and modifications within the true spirit and scope of the invention.

What I claim is:

1. A combination bread making machine and cooker for food processing comprising a rectangular heating chamber having interior walls, a shaft in said chamber projecting through a bottom opening and having a dough blade at the free end of said shaft, a heater and a rotatable fan adjacent thereto, a first motor for rotating said shaft, a second motor for operating said fan, a housing adjacent to said heating chamber, said heater, fan, and first and second motors being mounted in said housing laterally disposed from said heating chamber, said housing having a vertical wall adjacent to said chamber, a relatively large opening in said wall, a baffle having an edge extending at an angle to the interior walls of said chamber whereby when said rotating fan propels the heated air through said opening and into bouncing contact with the interior walls of said heating chamber the friction created thereby augments the temperature of the hot air in the chamber, a pulley connected to said shaft, a spaced pulley rotated by said first motor, and a driving belt passing around said pulleys to thereby rotate said shaft when then the first motor is operative.

2. The device as claimed in claim 1 wherein said heating chamber is provided with pivotable top and side doors for access and removal of the food products.

3. A combination bread making machine and cooker provided with a manual cycle, a rectangular heating chamber having interior walls, a shaft in said chamber having a dough blade, a heater and a rotatable fan adjacent to said chamber, a first motor for rotating said shaft, a second motor for operating said fan, a housing adjacent to said heating chamber, said first and second motors and heater and fan being mounted in said housing laterally disposed from said heating chamber, a vertical wall separating said housing from said heating chamber, said wall having an opening with a baffle of a predetermined configuration whereby when said rotating fan propels the heated air through said opening and into bouncing contact with the interior walls of said heating chamber the friction created thereby augments the temperature of the hot air in the chamber, and said heating chamber having a plurality of racks spaced horizontally whereby different food products can be cooked at different levels in the chamber.

4. The device as claimed in claim 3 wherein said baffle around the periphery of the opening in the vertical wall is angled relative to the walls of the rectangular chamber.

5. The device as claimed in claim 3 wherein the opening in said vertical wall is provided with a grille.

6. The device as claimed in claim 3 wherein said chamber is provided with a rack which rests on the floor of said chamber but is elevated over said shaft whereby a plurality of loaves of bread may be baked simultaneously.

7. The device as claimed in claim 3 further comprising a drip pan in said chamber, means in said chamber for mounting said drip pan over said shaft, at least one bread pan in said chamber, and a rack removably mounted in said chamber for supporting said bread pan.

8. The device as claimed in claim 7 wherein there are two rectangular shaped bread pans.

* * * * *